(12) United States Patent
Burmeister et al.

(10) Patent No.: US 7,226,967 B2
(45) Date of Patent: *Jun. 5, 2007

(54) REACTIVE PHENOLIC RESINS IN THE PREPARATION OF HIGHLY VISCOUS SELF-ADHESIVE COMPOSITIONS

(75) Inventors: Axel Burmeister, Hamburg (DE); Sven Hansen, Hamburg (DE); Heiko Leydecker, Neustadt/Holstein (DE); Christian Kreft, Hamburg (DE); Jochen Stahr, Hannover (DE)

(73) Assignee: tesa AG, Hamburg (DE)

( * ) Notice: Subject to any disclaimer, the term of this patent is extended or adjusted under 35 U.S.C. 154(b) by 166 days.

This patent is subject to a terminal disclaimer.

(21) Appl. No.: 10/901,781

(22) Filed: Jul. 29, 2004

(65) Prior Publication Data

US 2005/0004287 A1 Jan. 6, 2005

Related U.S. Application Data

(62) Division of application No. 09/641,645, filed on Aug. 18, 2000, now Pat. No. 6,822,029.

(30) Foreign Application Priority Data

Aug. 18, 1999 (DE) ................................ 199 39 074

(51) Int. Cl.
*C08F 283/08* (2006.01)
(52) U.S. Cl. ...................... 524/508; 524/515
(58) Field of Classification Search ................ 524/508, 524/515
See application file for complete search history.

(56) References Cited

U.S. PATENT DOCUMENTS

| | | | |
|---|---|---|---|
| 3,597,377 A | 8/1971 | Berejka et al. | 260/27 |
| 4,028,292 A * | 6/1977 | Korpman | 524/203 |
| 4,332,655 A | 6/1982 | Berejka | 204/159.2 |
| 5,095,068 A | 3/1992 | Chiu | 524/525 |
| 5,539,033 A | 7/1996 | Bredahl et al. | 525/270 |
| 5,550,175 A | 8/1996 | Bredahl et al. | 523/348 |
| 5,760,135 A | 6/1998 | Korpman et al. | 525/95 |
| 5,952,425 A | 9/1999 | Medsker | 525/133 |
| 6,214,460 B1 * | 4/2001 | Bluem et al. | 428/355 AC |
| 6,287,411 B1 | 9/2001 | Kelley | 156/327 |
| 6,822,029 B1 * | 11/2004 | Burmeister et al. | 524/271 |

FOREIGN PATENT DOCUMENTS

| | | |
|---|---|---|
| EP | 0 668 335 | 8/1995 |
| EP | 0 668 819 | 8/1995 |
| EP | 0 751 980 | 1/1997 |
| WO | 94/11175 | 5/1994 |
| WO | 95/25774 | 9/1995 |
| WO | 97/07963 | 3/1997 |

OTHER PUBLICATIONS

Derwent abstract JP 95 331 197, dated 1995.
R. Brzozowski, J.L. White and B. Kalvani in Kunststoffe 80 (8), (1990), p. 922 ff.
Werner Hoffmann, "Vulkanisation und Vulkanisationshifsmittel" [Vulaknization and Vulcanizing Auxilliaries], 1965 BAYER.
Derwent abstract (Accession #080389) of JP 2034680 dated Feb. 5, 1990.
Patent Abstracts of Japan, publication No. 06158008, publication date Jun. 7, 1994 of application #04310148, application dated Nov. 19, 1992 of Nitto Denko Corp.

* cited by examiner

*Primary Examiner*—Edward J. Cain
(74) *Attorney, Agent, or Firm*—Norris McLaughlin & Marcus PA

(57) ABSTRACT

Hot-melt pressure-sensitive adhesive based one or more non-thermoplastic elastomers, at least comprising 100 parts by mass of the non-thermoplastic elastomer(s), from 1 to 200 parts by mass of one or more tackifying resins, from 1 to 100 parts by mass of one or more reactive phenolic resins whose methylol content is from 1 to 20% by weight, based on the reactive phenolic resin, from 1 to 100 parts by mass of accelerator substances.

11 Claims, 1 Drawing Sheet

Figure 1:
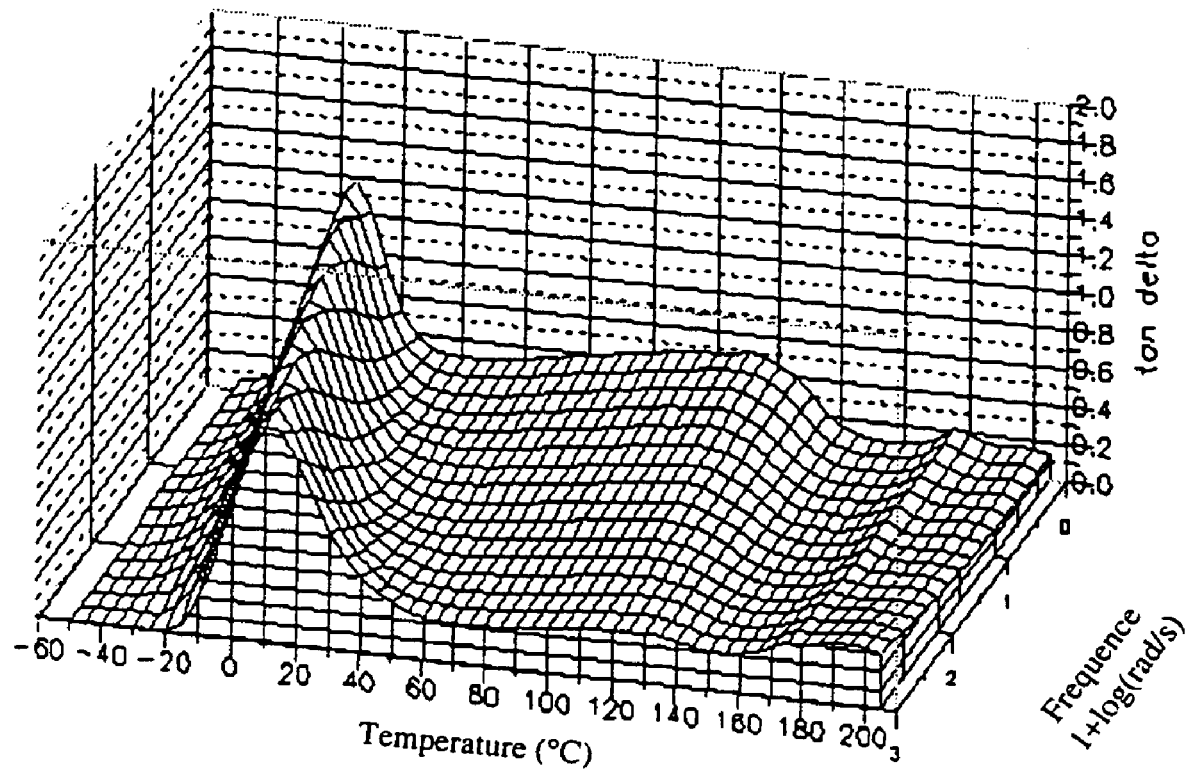

REACTIVE PHENOLIC RESINS IN THE PREPARATION OF HIGHLY VISCOUS SELF-ADHESIVE COMPOSITIONS

This application is a divisional application of U.S. Ser. No. 09/641,645, filed on 18 Aug. 2000, now U.S. Pat. No. 6,822,029

The present invention relates to the use of reactive phenolic resins for the chemical/thermal crosslinking of hot-melt pressure-sensitive adhesives (PSAs) based on non-thermoplastic elastomers, such as natural rubber, for example, using tackifying resins, optionally fillers and plasticizers, and to the application of these hot-melt PSAs to produce self-adhesive articles, especially for producing high-performance self-adhesive articles such as tapes or labels.

From the conventional technology of the solvent-based preparation and coating, for example, of natural-rubber pressure-sensitive adhesives, the use of reactive phenolic resins for crosslinking the adhesive compositions is known.

Described as suitable for accelerating this reaction are organometallic derivatives of metals of group IV of the Periodic Table, inorganic activators (zinc oxide, zinc resinates), and acids.

Other vulcanization accelerators are sidechain-halogenated reactive phenolic resins, polychloroprenes, chlorinated paraffins, zinc stearates and metal chlorides such as, for example, Zn(II) chloride, $SnCl_2*2H_2O$, $FeCl_3*6H_2O$.

In hot-melt pressure-sensitive adhesives based on non-thermoplastic elastomers, however, the use of the known thermal crosslinking systems has not been possible to date, since process problems occur in the course of the preparation.

This prior art is depicted at length, for example, in "Donatas Satas, Handbook of Pressure Sensitive Adhesive Technology", Second Edition, New York, 1989, p. 363, or Werner Hofmann, "Vulkanisation und Vulkanisationshilfsmittel" [Vulcanization and Vulcanizing Auxiliaries], 1965, BAYER.

The hot-melt PSAs developed in recent years on the polymer basis of non-thermoplastic elastomers, such as, for example, natural rubber or other high molecular mass rubbers, in the absence of a crosslinking step after application lack sufficient cohesion for the majority of applications. This is manifested in inadequate shear strength of the self-adhesive tapes manufactured in this way and may even lead to the formation of disruptive residues of adhesive, which make it impossible to achieve a desired residueless redetachability after use.

For many years, this deficiency prevented the use of hot-melt PSAs based on natural rubber in the self-adhesive tape applications traditionally dominated heavily by natural rubber, such as masking tapes or adhesive tapes for packaging.

The crosslinking processes used to date for hot-melt PSAs based on non-thermoplastic elastomers, by means of ionizing radiation (electron beams=EBC or ultraviolet light=UV), require the presence of appropriate, cost-intensive installations such as radiation sources and complex protective equipment, especially at relatively high film thicknesses.

Furthermore, in the case of many customary ingredients such as fillers, non-transparent resins and pigments, and in the case of thick films of adhesive, UV crosslinking is possible only to an extremely limited extent.

The use of exclusively non-thermoplastic rubbers as an elastomer component in the formulation of PSAs with the existing cost advantage possessed, for example, by natural rubbers over the standard commercial block copolymers, and the outstanding properties, especially the shear strength of natural rubber and of corresponding synthetic rubbers, and also processes for preparing, applying and crosslinking hot-melt PSAs based on non-thermoplastic elastomers, are also set out at length in the patents WO 9411175 A1, WO 9525774 A1, WO 9707963 A1 and, correspondingly, U.S. Pat. No. 5,539,033, U.S. Pat. No. 5,550,175, and also EP 0 751 980 B1 and EP 0 668 819 B1.

In these cases, the additives customary in PSA technology, such as tackifier resins, plasticizers and fillers, are described.

The preparation process disclosed in each case is based on a twin-screw extruder which permits compounding to a homogeneous PSA blend with the chosen process regime, involving mastication of the rubber and subsequent gradual addition of the individual additives with an appropriate temperature regime.

The mastication step of the rubber, which precedes the actual production process, is described at length. It is necessary and characteristic of the process chosen, since with the technology selected therein it is indispensable to the subsequent integration of the other components and to the extrudability of the blended hot-melt pressure-sensitive adhesive. Also described is the feeding-in of atmospheric oxygen, as recommended by R. Brzoskowski, J. L. and B. Kalvani in Kunststoffe 80 (8), (1990), p. 922 ff., in order to accelerate mastication of the rubber.

This procedure makes it absolutely necessary to practise the subsequent step of electron beam crosslinking (EBC), and to use reactive substances as EBC promoters in order to achieve an effective crosslinking yield.

Both process steps are described in the abovementioned patents, but the EBC promoters chosen also tend towards unwanted chemical crosslinking reactions at elevated temperatures, which limits the use of certain tackifying resins.

Owing to the unavoidable high product temperatures, compounding in a twin-screw extruder prevents the use of heat-activatable substances suitable for crosslinking the self-adhesive compositions, such as, for example, reactive (optionally halogenated) phenolic resins, sulphur or sulphur-donor crosslinker systems, since the chemical crosslinking reactions which ensue in the process result in such a great increase in viscosity that the coatability of the resulting hot-melt pressure-sensitive adhesive is impaired.

The patent application JP 95 278 509 discloses a self-adhesive tape in whose production natural rubber is masticated to an average molecular weight $M_w$=100,000 to 500,000 in order to obtain a coatable homogeneous mixture comprising hydrocarbon resins, rosin/rosin-derivative resins or terpene resins, which can be processed regularly at between 140° C. and 200° C. with a coating viscosity of from 10 to $50 \times 10^3$ cps, but subsequently requires an extremely high EBC dose (40 Mrad) in order to ensure the shear strength necessary for its use.

For backing materials such as impregnated and/or sized papers, and for woven backings based on viscose staple and the like, the system is not very suitable, since at the necessarily high beam doses there is significant deterioration of the backing.

A disadvantage of the crosslinking technologies (essentially EBC irradiation) described in the documents cited, in addition to the capital investment required, is the damage of certain sensitive backings by electron beams. This is manifested to a particular extent in the case of paper backings, viscose staple wovens, and siliconized release papers, but especially in the case of widespread film materials such as polypropylene, by a deterioration in the elongation-at-break properties.

Moreover, many standard commercial PVC films tend to discolour under EBC irradiation, such discoloration having a deleterious effect in the case of light-coloured or transparent film grades.

Furthermore, many of the release coatings which are customary in adhesive tape manufacture are damaged by electron beam irradiation and so are impaired in their effect. In an extreme case, this may result in the non-unrollability of adhesive tape rolls or in the non-reusability of transfer release papers, which are required in the adhesive tape production process.

Certain synthetic rubbers such as polyisobutylene (PIB), butyl rubber (IIR) and halogenated butyl rubber (XIIR), finally, are not amenable to electron crosslinking and are degraded under irradiation.

One way of minimizing these disadvantages consists in the use of certain substances which lessen the required beam dose and thus the concomitant damage. A range of such substances are known for use as EBC promoters. However, EBC promoters may also tend towards unwanted chemical crosslinking reactions at elevated temperatures, which limits the selection of the EBC promoters that can be used for hot-melt PSA production and, moreover, restricts the use of certain tackifying resins. These restrictions, and certain advantageous combinations of EBC promoters and non-crosslinking phenolic tackifier resins, are the subject-matter, in particular, of the document WO 97/07963.

The use of non-thermoplastic elastomers is also described in JP 95 331 197, where use is made of natural rubber having an average molecular weight (weight average) $M_w$<1 million g/mol with aliphatic, non-reactive hydrocarbon resins, which is blended with blocked isocyanates, precrosslinked at 150° C. for five minutes, and, following its subsequent coating onto PET film, is cured at 180° C. for several minutes (for example 15 minutes).

A disadvantage of this process, firstly, is the blocking agent released during the crosslinking reaction, which on the one hand, if it remains in the hot-melt pressure-sensitive adhesive, may impair the adhesion properties of the tape in a variety of respects, and on the other hand, on its escape in vapour form, leads to coating defects such as porosities and necessitates complex technology in order to draw off these blocking agents under suction and remove them.

Of particular disadvantage, however, is the high crosslinking temperature, which rules out temperature-sensitive backings such as many films and foams on principle and in the case of paper backings and release papers may lead to embrittlement.

In summary it may be stated that crosslinking of the known hot-melt pressure-sensitive adhesives based on non-thermoplastic elastomers necessitates either damagingly high radiation doses or else damagingly high temperatures with long crosslinking times, and both have the consequence of damage in the case of a large number of the customary backing materials.

The object of the invention is to remedy this situation and to combine the economic advantages of the solvent-free manufacture and application of hot-melt pressure-sensitive adhesives based on non-thermoplastic elastomers with the chemical-thermal crosslinking possibilities of the conventional solvent technology for thick adhesive compositions, including filled and coloured hot-melt pressure-sensitive adhesives, with high film thicknesses on radiation- and temperature-sensitive backing materials and to remedy the disadvantages of thermal crosslinkers which can be used in hot-melt pressure-sensitive adhesives according to the prior art.

This object is achieved by means of a hot-melt pressure-sensitive adhesive as characterized more closely in the main claim. The subsidiary claims relate to advantageous developments of the subject-matter of the invention, to advantageous possibilities for use, and to processes for producing the backing materials coated with the subject-matter of the invention.

The invention accordingly provides a hot-melt pressure-sensitive adhesive (PSA) based on one or more non-thermoplastic elastomers which comprises:
  100 parts by mass of the non-thermoplastic elastomer(s),
  from 1 to 200 parts by mass of one or more tackifying resins,
  from 1 to 100 parts by mass of one or more reactive, optionally also halogenated, phenol-formaldehyde resins whose methylol content is between 1 and 20% by weight and/or whose halogen content is between 1 and 20% by weight, based in each case on the reactive phenolic resin,
  from 1 to 100 parts by mass of accelerator substances.

The crosslinking of hot-melt pressure-sensitive adhesives based on non-thermoplastic elastomers with phenol-formaldehyde resins has a particular advantage in that a desired residue-free redetachability after use is made possible.

Preferably, the elastomer or elastomer mixture has an average molar mass of from 300,000 to $1.5*10^6$ g/mol, determined as the weight average using a GPC measurement. In the GPC measurement (gel permeation chromatography, a liquid chromatography conducted in the form of a column chromatography) a liquid phase comprising the dissolved polymer is passed through a gel. Smaller molecules of the dissolved substance are able to penetrate (diffuse) into all the pores; to them, the entire volume of the mobile phase in the separating column is available. For this reason, they are retained longer in the column than are the larger molecules. These molecules, which are larger than the largest pores of the swollen gel, are unable to penetrate the gel particles and migrate past them; they leave the column first. Consequently, in the eluate, the molecules appear in the order of decreasing molecular size. Since the molecular size is generally proportional to the molar mass, gel chromatography offers the possibility of separating and purifying substances of different molar masses and of determining molar masses.

With further preference, the hot-melt PSA in the uncrosslinked state has a complex viscosity of from 10,000 to 300,000 Pa*s at 0.1 rad/s and 110° C., preferably from 30,000 to 170,000 Pa*s at 0.1 rad/s and 110° C., very particularly from 40,000 to 140,000 Pa*s at 0.1 rad/s and 110° C.

The non-thermoplastic elastomers are advantageously selected from the following group, either individually or in any desired mixture:
  natural rubbers
  random-copolymerized styrene-butadiene rubbers (SBR)
  butadiene rubbers (BR)
  synthetic polyisoprenes (IR)
  butyl rubbers (IIR)
  halogenated butyl rubbers (XIIR)
  ethylene-vinyl acetate copolymers (EVA).

In a further advantageous development of the invention, the hot-melt PSA comprises a polymer blend of one or more of the non-thermoplastic elastomers and one or more thermoplastic elastomers, the latter again being selectable from the subsequent listing, individually or in any desired mixture:
- polypropylenes
- polyethylenes
- metallocene-catalysed polyolefins
- polyesters
- polystyrenes
- synthetic block copolymer rubbers As reactive phenolic resins it is also possible to use mixtures of reactive phenolic resins which are distinguished by differing reactivity. It is further possible to use reactive, halogenated phenolic resins which are notable for increased reactivity.

Reactive phenolic resins which may be used include the following, in a list which should not be understood as being conclusive.

Manufacturer: SCHENECTADY EUROPE S. A., Béthune, France

| Designation | Methylol content, % by weight |
| --- | --- |
| SP 103 | 12 |
| SFP 121 | 17 |
| SP 126 | 11 |
| SP 134 | 16 |
| SP 154 | 10 |
| FRJ 551 | 14 |
| SFP 183 | 15 |

Manufacturer: VIANOVA Resins GmbH, Wiesbaden, Germany

| Designation | Methylol content, % by weight |
| --- | --- |
| Vulkaresen PA 510 | 6–9 |
| Vulkaresen PA 130 | 11–14 |

Manufacturer: SCHENECTADY EUROPE S. A., Béthune, France (reactive, brominated phenolic resins)

| Designation | Methylol content, % by weight | Bromine content, % by weight |
| --- | --- | --- |
| SP 1055 | 10–14 | 3.5–4.5 |
| SP 1056 | 7.5–11 | 6–9 |

The crosslinking reaction may take place in the usual manner on the open belt in tunnel installations with an appropriate temperature regime.

For the crosslinking of the hot-melt PSAs it is also possible to utilize the heat treatment processes which are often used in adhesive tape production and are as required, for example, for the relaxation of film materials, or crosslinking may be effected at room temperature on the belt.

The accelerator substances are chosen in particular from the group of organic acids, especially resins containing acid groups, metal oxides, metal stearates, metal resinates, chlorinated paraffins, chloroprenes, chlorinated and brominated butyl rubbers, or chlorosulphonated polyethylenes.

To the hot-melt PSA it is possible to add fillers, which may in particular be selected from the group consisting of metal oxides, chalks, with particular preference chalks having specific surface areas of from 3 to 20 $m^2/g$, precipitated or pyrogenic silicas, with particular preference silicas having specific surface areas of from 20 to 250 $m^2/g$, preferably from 40 to 200 $m^2/g$, solid or hollow glass beads, with particular preference the solid or hollow glass beads having an average diameter of from 3 to 200 µm, preferably from 5 to 135 µm, microballoons, carbon blacks, with particular preference carbon blacks having specific surface areas of from 20 to 120 $m^2/g$, and/or glass fibres or polymer fibres.

It is also possible for the surface-modified variants of the fillers recited above to find application.

The microballoons are elastic, thermoplastic hollow beads which have a polymer shell. These beads are filled with low-boiling liquids or with liquefied gas. Suitable shell polymers are, in particular, acrylonitrile, PVDC, PVC or acrylates. Hydrocarbons such as the lower alkanes, pentane, for example, are suitable as the low-boiling liquid, while a suitable liquefied gas is a chemical such as isobutane.

Particularly advantageous properties are manifested when the microballoons have a diameter at 25° C. of from 3 µm to 40 µm, in particular from 5 µm to 20 µm.

By exposure to heat, the capsules expand irreversibly and three-dimensionally. Expansion comes to an end when the internal pressure is equal to the external pressure. In this way, a closed-cell foam backing is obtained which features good flow behaviour and high recovery forces.

Following thermal expansion due to elevated temperature, the microballoons advantageously have a diameter of from 20 µm to 200 µm, in particular from 40 µm to 100 µm.

This expansion may take place prior to or following the incorporation into the polymer matrix, or else before or after incorporation into the polymer matrix and shaping.

It is also possible to perform the expansion following incorporation into the polymer matrix and prior to shaping.

The fillers should be added in proportions of from 1 to 300 parts by mass per 100 parts of elastomer, individually or in any desired combination of the individual fillers.

It is further advantageous to admix plasticizers into the hot-melt PSA, the said plasticizers in turn being selected in particular from the group consisting of paraffinic or naphthenic oils, with particular preference paraffinic or naphthenic oils having kinematic viscosities at 20° C. of between 40 and 255 $mm^2/s$, oligomeric nitrile rubbers, with particular preference liquid nitrile rubbers having ACN contents of from 20 to 40% by weight, in particular from 20 to 35% by weight, liquid isoprene rubbers, with particular preference isoprene rubbers having molar masses of between 10,000 and 70,000 g/mol, oligobutadienes, with particular preference oligobutadienes or functionalized oligobutadienes having molar masses of from 1500 to 70,000 g/mol, soft resins, with particular preference soft resins having molar masses of from 100 to 2000 g/mol, in particular from 250 to 1700 g/mol, wool fats and/or rapeseed oils and castor oils.

The hot-melt PSA of the invention may find application in the production of a self-adhesive article by application of the said adhesive to at least one side of a web-form material, for example a material coated anti-adhesively on both sides, the hot-melt PSA being applied with a preferred rate of from 5 to 3000 $g/m^2$, with particular preference from 10 to 200 $g/m^2$.

The web-form material may in particular comprise a single-sidedly or double-sidedly coated paper backing or a single-sidedly or double-sidedly coated polymer film backing, in which case the application rate may be from 5 to 200 g/m² and in particular from 10 to 100 g/m².

As backings it is further possible to use wovens or nonwovens of all kinds.

Consolidated nonwoven webs are produced, for example, on stichbonding machines of the "Malifleece" type from the company Malimo and can be obtained, inter alia, from the companies Naue Fasertechnik and Techtex GmbH. A Malifleece is characterized in that a cross-laid web is consolidated by the formation of loops from fibres of the web.

The backing used may also be a web of the Kunit or Multiknit type. A Kunit web is characterized in that it originates from the processing of a longitudinally oriented fibre web to form a sheetlike structure which has the heads and legs of loops on one side and, on the other, loop feet or pile fibre folds, but possesses neither filaments nor prefabricated sheet-structures. A web of this kind has also been produced for many years, for example, on stitchbonding machines of the "Kunitvlies" type from the company Karl Mayer, formerly Malimo. A further characterizing feature of this web is that, as a longitudinal-fibre web, it is able to absorb high tensile forces in the lengthwise direction. The characteristic feature of a Multiknit web relative to the Kunit is that the web is consolidated on both the top and bottom sides by virtue of the double-sided needle punching.

Finally, stitchbonded webs are also suitable. A stitchbonded web is formed from a nonwoven material having a large number of stitches extending parallel to one another. These stitches are formed by the incorporation, by stitching or knitting, of textile filaments. For this type of web, stitchbonding machines of the type "Maliwatt" from the company Karl Mayer, formerly Malimo, are known.

Starting materials envisaged for the textile backing are, in particular, polyester fibres, polypropylene fibres or cotton fibres. The present invention, however, is not restricted to the aforementioned materials; rather, a large number of other fibres may be used to produce the web.

Needlepunched, wet-laid and/or air-jet- and/or water-jet-consolidated webs may be obtained, for example, from the company Freudenberg.

Particularly suitable thicknesses which have been found for the hot-melt PSA on the web-form material are between 5 µm and 3000 µm, preferably between 15 µm and 150 µm.

Furthermore, the hot-melt PSA may have been applied to a double-sidedly antiadhesively coated release paper in a thickness of from 20 µm to 3000 µm, in particular from 40 µm to 1500 µm.

One particularly suitable process for producing the self-adhesive articles set out above, especially for producing high-performance self-adhesive articles such as tapes or labels, is to apply the hot-melt PSA using a multi-roll applicator unit comprising from two to five rolls.

EXAMPLES

The examples which follow are intended to illustrate the use, in accordance with the invention, of reactive phenol-formaldehyde resins which are accelerated in their crosslinker action and are activated by additional substances for the chemical crosslinking of natural-rubber hot-melt pressure-sensitive adhesives, without restricting the invention.

The test methods used are briefly characterized below:

The adhesion tests on the adhesive tape specimens were conducted in each case after a 24 h storage period at room temperature and, for comparison, depending on example, after 7-day thermal conditioning at 70° C., comparability of the results being ensured by the additional storage of the thermally conditioned specimens, prior to the measurements, at 23° C. and 50% atmospheric humidity for 24 h.

Test Method 1: Bond Strength

The bond strength (peel strength) of the adhesive tape specimens was determined in accordance with AFERA 4001.

Falling bond strength levels are generally a sign of increasing degree of crosslinking of the hot-melt PSA.

Test Method 2: Shear Strength

The shear strength of the adhesive tape specimens examined was determined in accordance with PSTC 7 (Holding Power). All values reported were determined at room temperature under the stated load of 20 N with a bond area of 20×13 mm². The results are recorded in minutes of holding time.

An increase in the shear stabilities within the range examined, for a given hot-melt PSA formulation, denotes a higher degree of crosslinking and/or higher cohesion.

In the wider sense it is also necessary to consider the type of failure, in connection with which the following applies:
    undercrosslinked (weakly cohesive) hot-melt PSAs:
        short shear stability times with cohesive failure
    optimally crosslinked hot-melt PSAs:
        long shear stability time
    overcrosslinked (too cohesive) hot-melt PSAs:
        short shear stability times as a result of adhesive failure Test Method 3: Gel Content The degree of crosslinking of the already applied natural-rubber hot-melt PSA was determined on the finished adhesive tape by way of the gel content of the hot-melt PSA. For this purpose, adhesive tape samples in sections of 20 cm² were punched out and these sections were welded into a pouch made from polyethylene spunbonded fabric (commercial Tyvek from the company Du Pont, with a basis weight of approximately 55 g/cm²). The specimens were extracted by shaking with toluene at room temperature for three days. The toluene was changed each day. Following extraction, the toluene was replaced by hexane/heptane and the samples were dried at 110° C. The gel content was determined by differential weighing, taking into account the extraction losses from the spunbonded fabric and from the backing.

The result is stated as the gel value, in percent, the initially uncrosslinked elastomers being taken as 100%.

Test Method 4: Swelling Test

In a simplified procedure, it is also possible to determine the degree of crosslinking of the hot-melt PSA on the polymer basis of non-thermoplastic elastomers in a comparative manner, from swelling measurements.

For this purpose, an adhesive tape strip is placed in special boiling-point spirits 60/95 and then examined, visually and mechanically using a spatula, for the presence and consistency of swollen hot-melt PSA gel remaining on the tape.

The result is stated as the "swelling test" and embraces a scale from 0 to 6.

The ratings on this scale have the following meanings:

| Swelling test rating | Gel consistency in swelling test | Gel content by method 4 [%] |
|---|---|---|
| 0 | Layer of composition is fragmentary and sludgy, i.e. no crosslinking evident | 0–5 |

-continued

| Swelling test rating | Gel consistency in swelling test | Gel content by method 4 [%] |
|---|---|---|
| 1 | Severe swelling, composition very slimy and mobile, i.e. very low crosslinking | 5–15 |
| 2 | Severe swelling, composition is slimy and easy to displace | 15–25 |
| 3 | Good swelling, composition less slimy and displaceable | 25–35 |
| 4 | Slight swelling, composition barely slimy, still displaceable | 35–45 |
| 5 | Virtually no swelling, composition almost a coherent layer and virtually impossible to displace | 45–55 |
| 6 | No swelling, composition forms a coherent layer and can only be removed by scratching | >55 |

The optimum balance between cohesion and adhesion, expressed by the swelling test rating of the PSA in question, depends on the application of the specific adhesive tape. For general-purpose masking tapes, the optimum swelling test rating, for example, is 2–3; for high-temperature masking tapes with temperature stabilities of greater than 140° C. the optimum swelling test rating is 4–5.

Test Method 5: Viscoelastic Properties of Hot-Melt PSAs

Finally, the degree of crosslinking of a given hot-melt PSA may be determined very simply from the measurement of its viscoelastic properties. The evaluation of the results of these measurements requires in each case comparison with the uncrosslinked state of the hot-melt PSA, since the formulation in this case has a very strong influence on the absolute values measured. As a measure of crosslinking it is possible to state both the ratio of the viscosity of the crosslinked hot-melt PSA to the viscosity of the uncrosslinked hot-melt PSA and the corresponding ratio of the loss angles, normally expressed as tan δ.

In order to determine the viscoelastic properties of hot-melt PSAs, dynamic-mechanical measurements were conducted in torsion rheometers, with oscillating deformations being predetermined and resulting shear stresses measured (in reference thereto see, for example, W. M. Kulicke "Flow behaviour of substances and mixtures of substances", Hüthig and Wepf, 1986).

In the examples, use was made of an instrument of the type RDA II (Rheometric Dynamic Analyzer II from Rheometric Scientific GmbH, a torsion rheometer with a plate/plate measuring system). A prepared, planar, bubble-free sample of the hot-melt PSA with a film thickness of 1.5 mm was introduced into the measuring system. Measurement was in the temperature range from −50° to +200° C. and in a frequency range of from 0.1 rad/s to 100 rad/s with a constant standard force of 150 g.

The measurements were detected with computer assistance; the viscoelastic properties (storage modulus G', loss modulus G", loss angle tan δ, complex viscosity η*) of the hot-melt PSA were determined for the stated temperature and frequency ranges in the customary manner from the extent and course of the measured shear stresses over time.

Measurements of this kind can be conducted both on prepared hot-melt PSA samples and on complete adhesive tapes, it being necessary in the latter case to laminate adhesive tape samples to one another until the appropriate film thickness is reached and to fasten the backing side of the topmost layer to the corresponding plate of the measuring system using an appropriate structural adhesive.

Test Method 6: Processing Viscosity of the Hot-Melt PSA

In order to obtain rapid information on the viscoelastic properties of a hot-melt PSA, especially the degree of degradation or, respectively, degree of crosslinking of the framework polymer, during production, dynamic-mechanical measurements in accordance with above-described test method 5 were conducted in the frequency range from 0.1 rad/s to 100 rad/s at a constant standard force of 150 g, but with the measurement temperature left constant at 110° C. Prior to measurement, the hot-melt PSA samples were preheated at 110° C. in the measuring system for 7 minutes.

The value of the complex viscosity at a frequency of 0.1 rad/s and a temperature of 110° C. gives information, for identical formulation, on the cohesiveness and, respectively, degree of crosslinking of the hot-melt PSA.

To quantify the degree of crosslinking, the crosslinking number, CN, is introduced as the ratio of the respective complex viscosity of the crosslinked hot-melt PSA formulation to the complex viscosity of the uncrosslinked hot-melt PSA formulation:

CN Viscosity of the crosslinked hot-melt PSA/viscosity of the uncrosslinked hot-melt PSA.

Test Method 7: Molar Mass Determination by Means of Gel Permeation Chromatography The molar masses of the elastomer fraction present in the natural-rubber hot-melt PSAs were determined exclusively on uncrosslinked hot-melt PSA samples by means of GPC on polystyrene standard with the following measurement system:

| | |
|---|---|
| Eluent: | tetrahydrofuran (THF), analytical grade |
| Columns: | PSS-SDV, 5 µm 103 Å, ID 8.0 mm × 300 mm |
| | PSS-SDV, 5 µm 105 Å, ID 8.0 mm × 300 mm |
| Precolumn: | PSS-SDV, 5 µm 106 Å, ID 8.0 mm × 300 mm |
| Pump: | TSP P200 |
| Flow rate: | 1.0 ml/min |
| Injection system: | TSP AS3000 with 100 ml injection volume |
| Temperature: | 25° C. |
| Detectors: | TSP UV 2000 UV/VIS detector at 254 nm |
| | Shodex differential refractometer RI 71 |
| Evaluation: | PSS-WinGPC Version 4.02 |

In Examples P1 to P3, a natural-rubber hot-melt pressure-sensitive adhesive of overall formulation PA was prepared in each case in one or more stages. All formulations are specified in phr, i.e. in relation to 100 parts by mass of natural rubber.

The following components were used:

| | |
|---|---|
| Natural rubber | SVR 5L (obtainable from Weber Schaer, Hamburg) |
| Tackifier resin | "Staybelite Resin", a hydrogenated rosin (manufacturer: HERCULES) and |
| | HERCOTAC 205, an aromatic-modified aliphatic hydrocarbon resin (from Hercules BV, Rijswijk, NL) |
| Filler | Zinc oxide "Silox Actif" from the manufacturer SILOX, Belgium |
| Phenolic crosslinking resin | an octylphenol-formaldehyde resin having a methylol content of from 6 to 9% by weight ("Vulkaresen PA 510" from the manufacturer HOECHST) |
| Ageing inhibitor | Lowinox ® 22M46, a 2,2-methylenebis[6-(1,1-dimethylethyl)-4-methylphenol)] from GREAT LAKES |

In Examples P4 to P6, in addition to the formulation constituents already described, use is made of a β-pinene-based polyterpene resin ("Dercolyte S 115" from the manufacturer Lés Dérivés Résiniques & Térpeniques, Dax/ France) and, as plasticizer, of the paraffinic white oil "Ondina G 17" from the manufacturer Deutsche SHELL AG, Hamburg);

In Example P4, in addition, a polychloroprene rubber from the manufacturer DU PONT ("Neoprene WRT") was used;

In Example P5, in addition, a chlorinated copolymer of isobutylene and isoprene with the designation "EXXON® Chlorobutyl" from the manufacturer EXXON was used;

In Example P6, as halogenated rubber, in addition, a brominated butyl rubber "Polysar Brombutyl X2" from the manufacturer BAYER, Leverkusen was used; and In Example P8 the reactive bromophenolic resin "SP 1056" (condensation product of octylphenol and formaldehyde having a methylol content of from 9 to 13% by weight and a bromine content of 6–9% by weight), from the manufacturer SCHENECTADY EUROPE S. A., 62404 Béthune Cédex, France, was used.

The natural rubber was granulated, prior to use, in a granulator from Pallmann using small amounts of talc as release agent. The synthetic rubbers were also used in the form of granules.

The natural-rubber hot-melt PSAs prepared batchwise, as in Examples P1 and P2, or continuously, as in Example P3, were applied, immediately after their preparation, using a flexurally rigid 2-roll applicator unit. The hot-melt PSA was applied in accordance with the above-described 2-roll application process to a slightly creped paper backing, impregnated in accordance with industry-standard techniques and equipped with release and primer layers, with an adhesive film thickness of 50 μm. A coating nip was established between the first and the second, web-carrying coating roll in accordance with the application thickness. The first roll was temperature-controlled at 140° C., the web-carrying roll at from 60 to 80° C. Depending on the particular example, the natural-rubber hot-melt PSA supplied to the roll nip had a temperature of from 70° C. to 120° C.

Coating was carried out at the web speed adapted to the respective preparation process. In the case of continuous preparation of the hot-melt PSA, in Example P3, the natural-rubber hot-melt PSA was supplied to the roll nip by means of a belt or conveying extruder.

Formulation PA

|  | phr |
|---|---|
| Natural rubber SVR 5L | 100.00 |
| Staybelite Resin | 35.29 |
| Hercotac 205 | 19.61 |
| Vulkaresen PA 510 | 19.61 |
| Silox actif | 17.65 |
| Lowinox ® 22M46 | 3.92 |
| Total | 196.08 |

Example P1

In a first process step, a prebatch was prepared. The prebatch was prepared in accordance with the formulation designated VB-PA in a Banbury kneading device of type GK 1.4 N from Werner & Pfleiderer, Stuttgart.

Prebatch Formulation VB-PA

|  | phr |
|---|---|
| Natural rubber SVR 5L, granulated | 100.00 |
| Resin, Hercotac 205 | 19.61 |
| Lowinox | 3.92 |
| Silox actif | 17.65 |

The kneading chamber and rotors were temperature-controlled at 25° C. and the blade speed was 50 min$^{-1}$. The overall weight of the prebatch was 1.1 kg. All of the constituents were premixed in dry form and metered together with the white oil. A mixing time of six minutes was sufficient to homogenize the constituents of the prebatch.

In process step 2, the natural-rubber hot-melt PSA was mixed to completion. For this purpose, all further additives were added to the prebatch in a kneading machine of type LUK1.0 K3 from Werner & Pfleiderer, Stuttgart, to give a natural-rubber hot-melt PSA corresponding to the overall formulation PA. The prebatch was kneaded for ½ a minute, then the entire tackifier resin including the reactive phenolic resin, in accordance with formulation F-PA, was added.

Formulation F-PA

|  | phr |
|---|---|
| Prebatch VB-PA | 141.18 |
| Staybelite Resin | 35.29 |
| Vulkaresen PA 510 | 19.61 |

The overall weight of the hot-melt PSA was 500 g. The chamber temperature was set at 80° C. throughout the process of mixing to completion. The overall kneading time was 10 minutes.

Example P2

Example P1 was repeated.

To simplify discharge, the second process step, that of mixing to completion, was carried out using a kneading machine of type VI U 20 L from Aachener Misch-und Knetmaschinen-Fabrik Peter Küpper, Aachen, with a discharge screw. The prebatch was kneaded for ½ minute, then the entire tackifier resin and the reactive phenolic resin in accordance with formulation F-PA were added.

The overall weight of the hot-melt PSA was 12 kg. The chamber temperature was set at 80° C. The overall kneading time was 10 minutes, the discharge time 7 minutes.

Example P3

The natural-rubber hot-melt PSA was prepared using a planetary roll extruder from ENTEX Rust & Mitschke with three roll cylinders. The diameter of the roll cylinders was 70 mm. The first of the approach rings was provided with radial bores through which the liquids were supplied by means of metering pumps. Gravimetric metering units, metering pumps, and the rotary speed of the central spindle were set so as to give a product rate of 65 kg/h with homogeneous mixing. The individual roll cylinders were temperature-controlled so as to give a product temperature of 80° C.

The adhesive tapes obtained in accordance with Examples P1 to P3 crosslink following a 7-day storage period at 70° C.

and are all suitable as adhesive masking tapes with short-term temperature stability >120° C.

Results of Examples P1 to P3

|  | Storage 4 days at room temperature | Storage 7 days at 70° C. | Measurement method |
|---|---|---|---|
| Shear test 20 N on steel [min] |  |  | PSTC 7 |
| EXAMPLE P1 | 23 | 4226 |  |
| EXAMPLE P2 | 50 | 3850 |  |
| EXAMPLE P3 | 12 | 2112 |  |
| Bond strength on steel [N/cm] |  |  | AFERA 4001 |
| EXAMPLE P1 | 4.1 | 3.7 |  |
| EXAMPLE P2 | 4.1 | 3.5 |  |
| EXAMPLE P3 | 4.5 | 4.0 |  |
| Gel value |  |  | Test method 3 |
| EXAMPLE P1 | 4.3 | 30 |  |
| EXAMPLE P2 | 2.7 | 29 |  |
| EXAMPLE P3 | 5 | 19 |  |
| Swelling test |  |  | Test method 4 |
| EXAMPLE P1 | 0 | 3 |  |
| EXAMPLE P2 | 0 | 3 |  |
| EXAMPLE P3 | 0 | 2.5 |  |
| Complex viscosity at T = 110° C., f = 0.1 rad/s [Pa · s] |  |  | Test method 6 |
| EXAMPLE P1 | $7.3 * 10^4$ | $1.18 * 10^5$ |  |
| EXAMPLE P2 | $6.5 * 10^4$ | $1.19 * 10^5$ |  |
| EXAMPLE P3 | $5.1 * 10^4$ | $1.01 * 10^5$ |  |

The crosslinking reaction is clearly evident from the measurements.

Examples P4 to P6 show hot-melt pressure-sensitive adhesive formulations prepared with the process according to Example P1.

In the first process step, the formulation constituents natural rubber, synthetic rubbers, Silox actif, ageing inhibitor, and white oil were each mixed in an internal mixer with a mixing time of 4 minutes. The other formulation constituents were metered in in the second process step. Coating took place in each case in accordance with the 2-roll process described above. The hot-melt pressure-sensitive adhesives and the coated adhesive tapes were tested after 4 days' storage time under ambient climatic conditions and after 7 days of thermal conditioning at 70° C.; all examples show unambiguous crosslinking.

The results are shown in table form.

Example P4

|  | phr |
|---|---|
| SVR 5L | 78 |
| Neoprene WRT | 22 |
| Staybelite Resin | 46 |
| Vulkaresen PA 510 | 6.0 |
| Dercolyte S 115 | 22 |
| Silox actif | 20 |
| White oil | 6 |
| Total | 200 |

|  | Storage 4 days at room temperature | Storage 7 days at 70° C. | Measurement method |
|---|---|---|---|
| Shear test 20 N on steel [min] | 32 | 180 | PSTC 7 |
| Bond strength on steel [N/cm] | 4.2 | 3.8 | AFERA 4001 |
| Gel value | 7.7 | Not measured | Test method 3 |
| Swelling test | 0 | 1 | Test method 4 |
| Complex viscosity at T = 110° C., f = 0.1 rad/s [Pa · s] | 6.04E+04 | 9.01E+04 | Test method 6 |

Example P5

|  | phr |
|---|---|
| SVR 5L | 78 |
| EXXON ® Chlorobutyl | 22 |
| Staybelite Resin | 46 |

-continued

| | |
|---|---:|
| Vulkaresen PA 510 | 6.0 |
| Dercolyte S 115 | 22 |
| Silox actif | 20 |
| White oil | 6 |
| Total | 200 |

| | Storage 4 days at room temperature | Storage 7 days at 70° C. | Measurement method |
|---|---|---|---|
| Shear test 20 N on steel [min] | 38 | 629 | PSTC 7 |
| Bond strength on steel [N/cm] | 4.1 | 3.5 | AFERA 4001 |
| Gel value | 7.4 | Not measured | Test method 3 |
| Swelling test | 0 | 1 | Test method 4 |
| Complex viscosity at T = 110° C., f = 0.1 rad/s [Pa · s] | 6.53E+04 | 9.37E+04 | Test method 6 |

Example P6

| | phr |
|---|---:|
| SVR 5L | 78 |
| Polysar Brombutyl X2 | 22 |
| Staybelite Resin | 46 |
| Vulkaresen PA 510 | 6.0 |
| Dercolyte S 115 | 22 |
| Silox actif | 20 |
| White oil | 6 |
| Total | 200 |

| | Storage 4 days at room temperature | Storage 7 days at 70° C. | Measurement method |
|---|---|---|---|
| Shear test 20 N on steel [min] | 25 | 7406 | PSTC 7 |
| Bond strength on steel [N/cm] | 2.9 | 2.7 | AFERA 4001 |
| Gel value | 9.1 | Not measured | Test method 3 |
| Swelling test | 0 | 4 | Test method 4 |
| Complex viscosity at T = 110° C., f = 0.1 rad/s [Pa · s] | 7.79E+04 | 1.37E+05 | Test method 6 |

Example P7

| | phr |
|---|---:|
| SVR 5L | 100.00 |
| Staybelite Resin | 38 |
| Hercotac 205 | 11 |
| Vulkaresen PA 510 | 19 |
| Silox actif | 17 |
| Sontal | 3.8 |

| | Storage 4 days at room temperature | Storage 7 days at 70° C. | Measurement method |
|---|---|---|---|
| Shear test 20 N on steel [min] | 103 | >10,000 | PSTC 7 |
| Bond strength on steel [N/cm] | 2.9 | 2.5 | AFERA 4001 |

-continued

| | | | |
|---|---|---|---|
| Gel value | 7.1 | Not measured | Test method 3 |
| Swelling test | 0 | 6 | Test method 4 |
| Complex viscosity at T = 110° C., f = 0.1 rad/s [Pa · s] | 1.60E+05 | 5.42E+05 | Test method 6 |

Example P8

| | phr |
|---|---|
| SVR 5L | 100 |
| Staybelite Resin | 19 |
| Hercotac 205 | 37 |
| Harz SP 1056 | 11 |
| Silox actif | 19 |

| | Storage 4 days at room temperature | Storage 7 days at 70° C. | Measurement method |
|---|---|---|---|
| Shear test 20 N on steel [min] | 324 | >10,000 | PSTC 7 |
| Bond strength on steel [N/cm] | 2.5 | 2.4 | AFERA 4001 |
| Gel value | 5.3 | Not measured | Test method 3 |
| Swelling test | 1 | 6 | Test method 4 |
| Complex viscosity at T = 110° C., f = 0.1 rad/s [Pa · s] | 1.60E+05 | 3.42E+05 | Test method 6 |

Example P9

A masking tape was produced in accordance with the process from Example P3 and investigated in accordance with Test Method 5. The drop in the loss angle tan δ at temperatures above 130° C. shows the crosslinking process of the hot-melt pressure-sensitive adhesive on the paper backing during the measurement procedure (see FIG. 1).

| | Phr |
|---|---|
| SVR 5L | 100 |
| Staybelite Resin | 50 |
| Vulkaresen PA 510 | 10 |
| Silox actif | 33 |
| White oil | 15 |
| Dercolyte S 115 | 42 |

The invention claimed is:

1. Hot-melt pressure-sensitive adhesive based on one or more non-thermoplastic elastomers, comprising at least
   a) 100 parts by mass of one or more non-thermoplastic elastomers selected from the group consisting of natural rubbers, random-copolymerized styrene-butadiene rubbers (SBR), butadiene rubbers (BR), synthetic polyisoprenes (IR), butyl rubbers (IIR) and ethylene-vinyl acetate copolymers (EVA),
   b) from 1 to 200 parts by mass of one or more tackifying resins,
   c) from 1 to 100 parts by mass of one or more reactive phenolic resins whose methylol content is from 1 to 20% by weight based on the reactive phenolic resin, and
   d) from 1 to 100 parts by mass of accelerator substances.

2. Hot-melt pressure-sensitive adhesive according to claim 1, based on a polymer blend of one or more of the non-thermoplastic elastomers and one or more thermoplastic elastomers selected from the group consisting of polypropylenes, polyethylenes, metallocene-catalyzed polyolefins, polyesters, polystyrenes and synthetic block copolymer rubbers.

3. Hot-melt pressure-sensitive adhesive according to claim 1, wherein the crosslinking accelerator substances are selected from the group consisting of chloroprenes, chlorinated butyl rubbers, brominated butyl rubbers, chlorosulphonated polyethylenes, metal oxides, organic acids or salts thereof, metal stearates and metal resinates.

4. Hot-melt pressure-sensitive adhesive according to claim 1, wherein the reactive phenolic resins are halogenated and have a halogen content of from 1 to 20% by weight, based on the reactive phenolic resin.

5. Hot-melt pressure-sensitive adhesive according to claim 1, wherein the reactive phenolic resin comprises a mixture of different reactive phenolic resins having different reactivities.

6. Hot-melt pressure-sensitive adhesive according to claim 1, wherein fillers are added to the adhesive which are selected from the group consisting of metal oxides, chalks, precipitated or pyrogenic silicas, solid or hollow glass beads, microballoons, carbon blacks, glass fibers, polymer fibers and combinations thereof.

7. Hot-melt pressure-sensitive adhesive according to claim 1, wherein plasticizers are added to the adhesive which are selected from the group consisting of paraffinic or naphthenic oils, oligomeric nitrile rubbers, liquid isoprene rubbers, oligobutadienes, soft resins, wool fats, rapeseed oils, castor oils and combinations thereof.

8. Self-adhesive article comprising the hot-melt pressure-sensitive adhesive of claim 1 applied to at least one side of a web-form material.

9. Self-adhesive article according to claim 8, wherein the thickness of the hot-melt pressure-sensitive adhesive on the web-form material is between 5 µm and 3000 µm.

10. Self-adhesive article according to claim 9, wherein the hot-melt sensitive adhesive is applied in a thickness of from 40 µm to 1500 µm to a release paper having an anti-adhesive coating on both sides.

11. Process for producing self-adhesive articles wherein the hot-melt pressure-sensitive adhesive of claim 1 is applied to a web form material with the aid of a multi-roll applicator unit which comprises from two to five rolls.

* * * * *